(12) United States Patent
Bryant

(10) Patent No.: US 7,983,805 B2
(45) Date of Patent: Jul. 19, 2011

(54) METHOD AND APPARATUS FOR SWAPPING LEAD AND REMOTE LOCOMOTIVES IN A DISTRIBUTED POWER RAILROAD TRAIN

(75) Inventor: Robert F. Bryant, Palm Bay, FL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/762,443

(22) Filed: Apr. 19, 2010

(65) Prior Publication Data

US 2010/0204858 A1    Aug. 12, 2010

Related U.S. Application Data

(62) Division of application No. 11/067,188, filed on Feb. 26, 2005, now Pat. No. 7,715,956.

(51) Int. Cl.
*G06F 17/00* (2006.01)

(52) U.S. Cl. ........... 701/19; 701/20; 701/36; 701/70; 246/167 R; 246/182 R; 246/187 A; 303/7

(58) Field of Classification Search .......... None
See application file for complete search history.

(56) References Cited

U.S. PATENT DOCUMENTS

| | | | | |
|---|---|---|---|---|
| 5,039,038 A | * | 8/1991 | Nichols et al. | 246/3 |
| 5,969,643 A | * | 10/1999 | Curtis | 340/988 |
| 6,024,419 A | * | 2/2000 | Waldrop et al. | 303/3 |
| 6,322,025 B1 | * | 11/2001 | Colbert et al. | 246/167 R |
| 6,361,124 B1 | * | 3/2002 | Marra et al. | 303/15 |
| 6,401,015 B1 | * | 6/2002 | Stewart et al. | 701/19 |
| 6,759,951 B2 | * | 7/2004 | Kellner et al. | 340/438 |
| 6,789,004 B2 | * | 9/2004 | Brousseau et al. | 701/19 |
| 6,862,502 B2 | * | 3/2005 | Peltz et al. | 701/19 |
| 7,038,597 B2 | * | 5/2006 | Smith | 340/933 |
| 7,715,956 B2 | * | 5/2010 | Bryant | 701/19 |
| 7,860,680 B2 | * | 12/2010 | Arms et al. | 702/127 |
| 2010/0204858 A1 | * | 8/2010 | Bryant | 701/19 |

* cited by examiner

*Primary Examiner* — Khoi Tran
*Assistant Examiner* — Jonathan L Sample
(74) *Attorney, Agent, or Firm* — Robert Wawrzyn, Esq.; John DeAngelis, Esq.; Beusse Wolter Sanks Mora & Maire, P.A.

(57) ABSTRACT

A communications system for a train having spaced apart first and second locomotives each capable of lead and remote operation and rail cars. The first locomotive operating as a lead unit controlling the second locomotive operating as a remote unit. The train comprising a brake system comprising a brake pipe extending a length of the train and controlled by a brake controller in the first and second locomotives. The communications system comprises a communications channel; a station in the first locomotive issuing a first command over the channel to the second locomotive, the first locomotive applying brakes and entering a suspended operational state during which its lead operation is suspended; and a station in the second locomotive issuing a second command over the channel to the first locomotive controlling it to remote operation and controlling the second locomotive to lead operation, and terminating the suspended operational state.

14 Claims, 2 Drawing Sheets

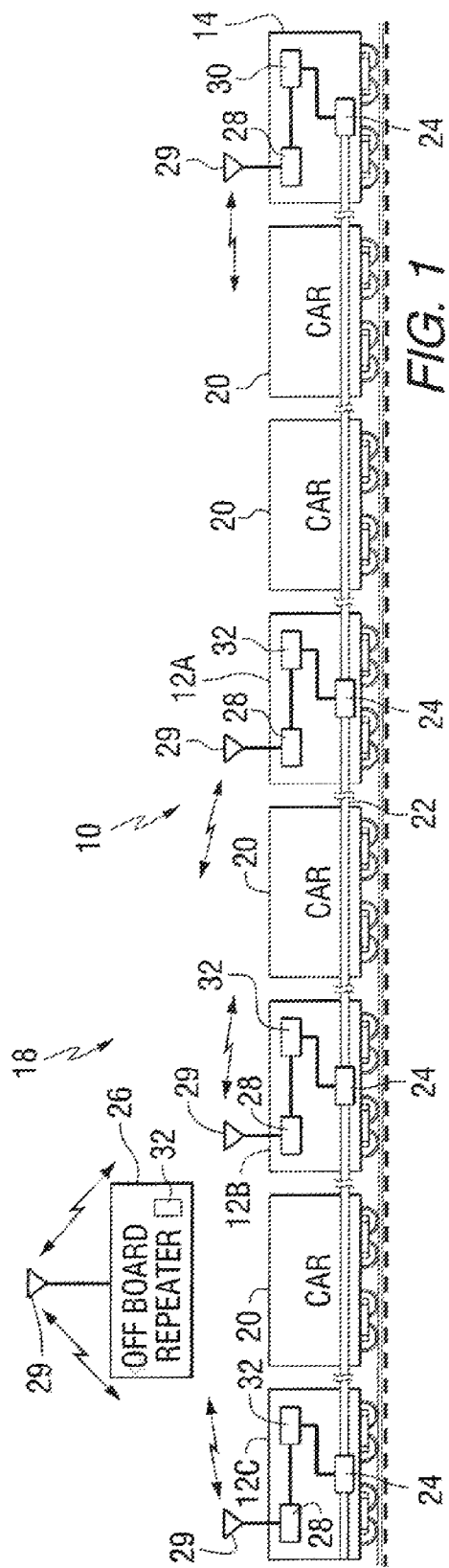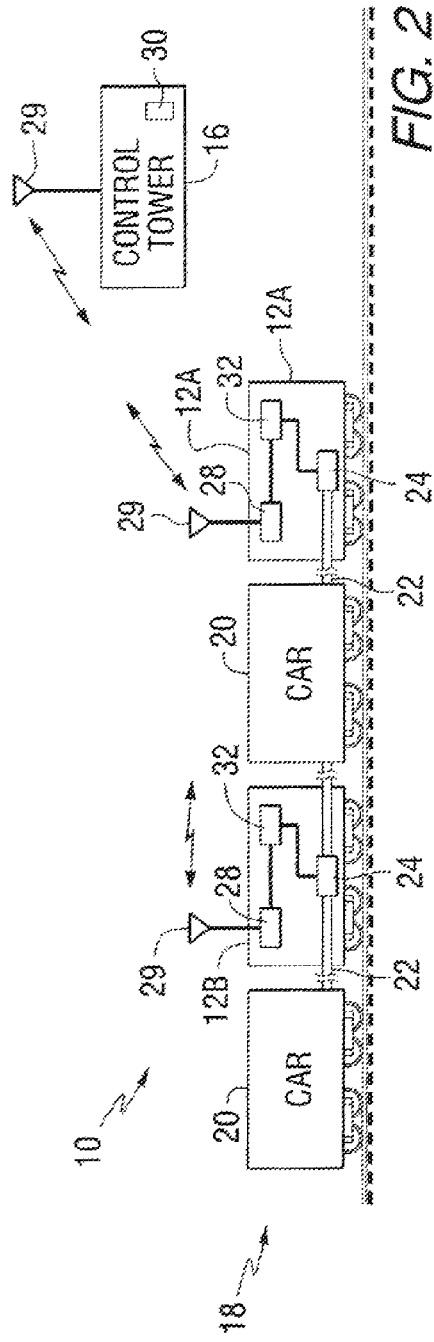

METHOD AND APPARATUS FOR SWAPPING LEAD AND REMOTE LOCOMOTIVES IN A DISTRIBUTED POWER RAILROAD TRAIN

This patent application claims the benefit of and is a divisional application of U.S. patent application Ser. No. 11/067,188 filed on Feb. 26, 2005 (now U.S. Pat. No. 7,715,956), which claims the benefit of U.S. Provisional Patent Application No. 60/548,387, filed on Feb. 27, 2004.

FIELD OF THE INVENTION

This invention relates generally to distributed power railroad trains comprising a lead locomotive and one or more remote locomotives, and particularly to a method and apparatus for swapping the lead and the remote locomotives of a distributed power railroad train.

BACKGROUND OF THE INVENTION

Distributed power railroad train operation supplies motive power and braking action from a lead locomotive (or lead unit) and one or more remote locomotives (or remote units) spaced apart from the lead unit in a train. In one configuration, a distributed power train comprises a lead locomotive at a head end of the train, a remote locomotive at an end of train (EOT) position and one or more mid-train locomotives disposed between the head end and the end of train. Distributed train operation may be preferable for long train consists to improve train handling and performance.

In a distributed power train, each lead and remote locomotive supplies motive power and braking action for the train. Motive and braking command messages are issued by an operator in the lead locomotive and supplied to the remote locomotives over a radio frequency communications system, (such as the prior art LOCOTROL® distributed power communications system, available from the General Electric Company of Schenectady, N.Y.) comprising a radio frequency link and receiving and transmitting equipment at the lead and the remote units. The receiving remote locomotives respond to these commands to apply tractive effort or braking effort to the train, and advise the lead unit of the receipt and execution of the received command. The lead unit also sends other messages to the remote units, including status request messages. The remote units respond by sending a status reply message back to the lead unit.

In a train where two or more locomotives are coupled together and thus function in unison via signals transmitted over their connected MU (multiple unit) lines, one of the locomotives is designated as a controlling remote unit with respect to the distributed power communications system. Only the controlling remote unit is configured to receive commands transmitted by the lead unit and respond to the lead unit with appropriate reply messages.

One of the most critical aspects of train operation is the predictable and successful operation of the air brake system. The air brake system comprises locomotive brakes in each locomotive (including the lead locomotive and all the remote locomotives) and car brakes at each railcar. The lead unit locomotive brakes are controlled by the locomotive operator in response to a position of a locomotive brake handle, and the rail car brakes are controlled in response to a position of an automatic brake handle. The locomotive brakes can also be controlled by the automatic brake handle.

The automatic brake controller controls a pressure in a fluid carrying brake pipe that extends the length of the train and is in fluid communication with a car brake system for applying or releasing car brakes at each railcar in response to a pressure change in the brake pipe. Specifically, a control valve (typically comprising a plurality of valves and interconnecting piping) at each railcar responds to changes in the brake pipe fluid pressure by applying the brakes (in response to a decrease in the brake pipe fluid pressure) or by releasing the brakes (in response to an increase in the brake pipe fluid pressure). The fluid within the brake pipe conventionally comprises pressurized air. In a conventional train having only a consist of locomotives at the head end, operator control of the automatic brake handle in the lead locomotive initiates a pressure drop that propagates along the brake pipe toward the end of the train. The control valve at each railcar senses the pressure drop and in response thereto supplies pressurized air from a local railcar reservoir to wheel brake cylinders that in turn draw brake shoes against railcar wheels. The railcar reservoir is recharged by air withdrawn from the brake pipe during non-braking operational intervals. A brake release is also commanded by the lead operator by controlling the automatic brake handle to effect a pressure increase in the brake pipe. The pressure increase is sensed at the railcars, and in response, the brake shoes are released from the railcar wheels. With some limitations as required to maintain train control, in a distributed power train, a brake command or brake release can be commanded by the lead or the remote locomotives.

The railcar brakes can be applied in two modes, i.e., a service brake application or an emergency brake application. In a service brake application, braking forces are applied to the railcar to slow or bring the train to a stop at a forward location along the track. During service brake applications the brake pipe pressure is slowly reduced and the brakes are applied gradually in response thereto. The operator controls the rate at which the pressure is reduced by operation of the automatic brake control handle. A penalty brake application is a service brake application in which the brake pipe is reduced to zero pressure, but the evacuation occurs at a predetermined rate, unlike an emergency brake application as described below and the railcars do not vent the brake pipe.

An emergency brake application commands an immediate application of the railcar brakes through an immediate evacuation or venting of the brake pipe. When a railcar senses a predetermined pressure reduction rate, indicative of an emergency brake application, the railcar also vents the brake pipe to accelerate propagation of the brake pipe evacuation along the train. Unfortunately, because the brake pipe runs for several thousand yards through the train, the emergency brake application does not occur instantaneously along the entire length of the brake pipe. Thus the braking forces are not uniformly applied at each railcar to stop the train.

On distributed power trains, braking is accomplished by venting the brake pipe at both the lead and remote locomotives, thus accelerating the brake pipe venting and application of the brakes at each railcar, especially for those railcars near the end of the train. As can be appreciated, brake pipe venting at only the lead unit in a conventional train requires propagation of the brake pipe pressure reduction along the length of the train, thus slowing brake applications at railcars distant from the lead unit. For a distributed power train with an operative communications link between the lead and remote units, when the train operator commands a brake application (e.g., a service or an emergency brake application) by operation of the automatic brake control handle at the lead unit, the brake pipe is vented and a brake application command is transmitted to each remote unit over the radio frequency communications link. In response, each remote unit also vents the brake pipe. Thus braking action at the remote locomotives follows the braking action of the lead unit in response to signals transmitted by the communications system.

A brake release initiated at the lead unit is also communicated over the radio frequency link to the remote units so that the brake pipe is recharged from all locomotives, reducing the brake pipe recharge time.

If an emergency brake application is initiated at the lead locomotive by the train operator or due to a detected failure condition, the radio frequency communication system sends an emergency brake signal to each of the remote locomotives over the radio frequency link. In response, the remote locomotives evacuate the brake pipe. This permits faster execution of the emergency brake application since the brake pipe is being evacuated from all of the locomotives, rather than from only the lead locomotive as in a conventional train.

During certain railroad operations, it is desirable to swap or reverse the operational status of the remote and lead units such that the lead unit at the head of the train is reconfigured as a remote unit at the end of the train, and the remote unit at the end of the train is reconfigured as the lead unit. For example, when unloading a coal train at an electrical generating plant track spur, the train passes through the dumping area in one direction until each railcar has dumped a coal load. The train is then reversed to exit the spur in a reverse direction, i.e., the lead locomotive pushes the train in reverse to exit the spur. If the train comprises a distributed power train, it would be desirable to swap the lead and the end-of-train remote unit's functionality to avoid operating both these units in reverse. The train could then be driven from the spur track with the head end unit operating in a forward direction such that the train is pulled along the track, rather than pushing the train from the end-of-train. A similar situation arises when a distributed power train enters a mine spur where the railcars are loaded with material extracted from the mine. The LOCOTROL® communication system includes a feature that permits each locomotive in the train to operate as a lead unit or as a remote unit, although the unit must be reconfigured or reprogrammed to change its operational status.

As can be appreciated by those skilled in the art, there are other operating scenarios to which the teachings of the present invention can be applied. For example, it is desired to switch a distributed power train traveling west on an east-west track to travel north on a north-south intersecting track. Assuming the north-south track has only a south bound entry from the east-west track, the train switches to the south bound leg of the north-south track such that the lead locomotive enters the south bound leg first and an end-of-train locomotive enters the south bound leg last. After the entire train has entered the southbound leg, the track switch is operated to align the southbound leg with the northbound leg. To proceed north, the lead unit, now at the end of the train, is operated in reverse. The end of train unit also operates in reverse and leads the train out of the southbound leg onto the northbound leg. Here too it would be preferable to swap the lead and the remote locomotive functionalities so that both are operating in a forward direction and the locomotive at the head of the train is the lead locomotive with respect to the distributed power communications system.

It is not a trivial matter to reverse a distributed power train that employs a communication system for transmitting signals between the lead unit and the remote units. Each remote unit requires lead unit identification information to process and respond to received messages, and each remote unit is configured to respond to commands and messages from only that lead unit. Thus when the lead unit is changed, each of the remote units must be reconfigured to accept commands and messages from the new lead unit, i.e., identification information for the new lead unit must be supplied to each of the remote locomotives. Also, the former lead unit must be reconfigured to remote unit functionality. The operating direction (also referred to as train line orientation) of certain of the locomotives must also be reversed.

In a distributed power train having a locomotive at the rear end of the train, it is common practice for the train crew to perform the following steps to "reverse" the train, thereby permitting operation from a new lead unit that was formerly the end-of-train remote unit.

The lead unit is unlinked from all of the remote units, i.e., the lead unit is reconfigured such that it cannot transmit signals to the remote units, and the remote units are reconfigured such that they cannot receive signals from the lead unit. For safety reasons, when these communication links are terminated, an emergency or a penalty brake application is automatically effectuated to prevent train movement. Both an emergency and a penalty brake application deplete nearly all the air in the brake pipe and a significant volume of air from the railcar reservoirs.

After unlinking the train, the former lead unit is reconfigured to operate as an additional remote unit for receiving commands and messages from a new lead unit. The reconfiguration process includes advising the new remote unit of a unique identifier associated with the new lead unit, e.g., a locomotive road number. All remote units use the lead identification information to confirm that received messages or commands were transmitted from the lead locomotive. Without this confirmation feature, a remote locomotive could respond to a command or message transmitted from a lead unit of another train in the area. The reconfiguration process also includes reversing the operational direction of the former lead unit. That is, if the locomotive was operating in the forward direction, it is configured to operate in the reverse direction. However, during operation the remote unit can be commanded to operate in the forward direction whenever desired, but the unit must be properly configured relative to the operating direction of the lead unit so that commands issued by the lead unit are properly interpreted at the remote unit.

After completing the reconfiguring process to operate the former lead unit as a remote unit, the crew relocates to the new lead unit of the train.

If the distributed power train includes mid-train remote units, these must also be manually reconfigured to permit linking to the new lead unit. Typically, this is accomplished by the crew as they walk from the former lead unit to the new lead unit. Mid-train remote reconfiguration includes supplying each mid-train remote unit with identification information for the new lead unit. For example, a road number for the new lead unit can be used as the identification information. Additionally, the reconfiguration process requires reversing the operational direction of each mid-train remote unit. That is, if a remote unit were previously configured to operate in a forward mode when the former lead unit was operating in the forward direction, the remote unit is reconfigured to operate in a reverse mode when the new lead unit operates in forward. Simply stated, each mid-train remote unit must be configured to operate in either the forward mode or the reverse mode when the lead unit operates in the forward direction, so that forward and reverse commands issued by the lead unit are properly interpreted at the mid-train remote units.

When the crew arrives at the new lead unit, they reconfigure the former remote unit to operate as the new lead unit. This process includes changing the operating direction of the new lead unit and executing a train linking operation to link the lead and remote locomotives to the communications system.

The linking process configures the communications system over which the lead and remote units (including the new remote unit that previously operated as the lead unit) communicate commands and messages. The linking process begins by advising the lead unit of the remote unit road numbers, and creating and sending a link message, in accordance with a predetermined format, from the new lead unit successively to each remote unit. Upon receipt of the message, each remote unit determines whether certain unique address/identification fields in the message match address/identification information of the receiving remote unit and address/identification fields of the sending lead unit. This address/identification comparison process ensures that the received message was intended for the receiving remote unit and was transmitted by the lead unit of the train. If the address/identification information is not in agreement, the remote unit remains in an unlinked condition, i.e., no messages or commands can be exchanged between the lead unit and the unlinked remote unit during train operation.

If the compared address/identification fields agree, the remote unit starts a link timer, and creates and transmits a link reply message having a predetermined format and including address/identification information of the transmitting remote unit. The lead unit receives the link reply message and compares the address/identification fields in the message with stored values to confirm that the message was intended for the receiving lead unit and was transmitted from the appropriate remote unit. If the comparison process does not result in matching address/identification information, the lead unit and the remote unit are not linked.

If the address/identification fields in the link reply message agree, the lead unit transmits a command message to the remote unit that sent the link reply message. At the receiving remote unit, the command completes the link-up sequence and places the remote unit in the linked state. Thereafter messages can be sent and received between the lead unit and the linked remote unit. The process continues until all of the remote units in the train are linked to the lead unit. Once the locomotives are linked, all remote units can recognize commands and messages received from the lead unit to which they are linked, and the lead unit can recognize messages received from remote units to which it is linked.

After the train is linked the emergency or penalty brake application that was commanded at the beginning of the swapping process is released by charging the brake pipe to its nominal pressure value (i.e., about 90 psi in one embodiment). After executing a brake pipe test, to be described below, the communication system is placed in a run mode and the crew in the new lead unit can apply motive power to move the train.

Typically, this prior art process of swapping the lead and remote units incurs a 20 to 60-minute delay penalty before the train can depart. The extent of actual delays varies depending upon train length (which affects brake pipe recharge time), leakage along the brake pipe (requiring a longer period for the brake pipe to fill from the evacuated state due to emergency or penalty brake application), ambient temperature and the number of remote units in the train.

FIGS. 1 and 2 schematically illustrate a distributed power communications system 10 for controlling one or more remote units 12A-12C from either a lead unit 14 (FIG. 1) or a control tower 16 (FIG. 2) in a distributed power train. The teachings of the present invention can be applied to the distributed power communications system 10. In one embodiment, a communications channel of the communications system 10 comprises a single half-duplex communications channel having a three kHz bandwidth, where the messages and commands comprise a serial binary data stream encoded using frequency shift keying modulation. The various bit positions convey information regarding the type of transmission (e.g., message, command, alarm), the substantive message, command or alarm, the address of the receiving unit, the address of the sending unit, conventional start and stop bits and error detection/correction bits. The details of the messages and commands provided by the system and the transmission format of individual messages and commands are discussed in detail in commonly owned U.S. Pat. No. 4,582,280, which is hereby incorporated by reference.

It should be understood that the only difference between the systems of FIGS. 1 and 2 is that the issuance of commands and messages from the lead unit 14 of FIG. 1 is replaced by the control tower 16 of FIG. 2 and certain interlocks of the system of FIG. 1 are eliminated. Typically, the control tower 16 communicates with the lead unit 14, which in turn is linked to the remote units 12A-12C.

A train 18 of FIGS. 1 and 2, further comprises a plurality of railcars 20 interposed between the remote units 12A and 12B and between the remote units 12B and 12C (of FIG. 1). The arrangement of locomotives and cars illustrated in FIGS. 1 and 2 is merely exemplary, as the present invention can be applied to other locomotive/railcar arrangements. The cars 20 are provided with an air brake system (not shown in FIGS. 1 and 2) that applies the railcar air brakes in response to a pressure drop in a brake pipe 22, and releases the air brakes upon a pressure rise in the brake pipe 22. The brake pipe 22 runs the length of the train for conveying the air pressure changes specified by the individual air brake controls 24 in the lead unit 14 and the remote units 12A, 12B and 12C.

An off board repeater 26 may be disposed within radio communication distance of the train 18 for relaying communications signals between the lead unit 14 and one of the remote units 12A, 12B and 12C. The off board repeater 26 is typically installed in a location where direct communications between the lead unit 14 and the remote units 12A-12C is hampered, such as while the train 18 is passing through a tunnel.

The lead unit 14, the remote units 12A, 12B and 12C, the off board repeater 26 and the control tower 16 are provided with a transceiver 28 operative with an antenna 29 for receiving and transmitting communications signals over the communications channel.

The lead unit transceiver 28 is associated with a lead station 30 for generating and issuing commands and messages from the lead unit 14 to the remote units 12A-12C. Commands are generated in lead station 30 in response to operator control of the motive power and braking controls within the lead unit 14, as described above. Each remote unit 12A-12C and the off board repeater 26 comprises a remote station 32 for processing and responding to transmissions from the lead unit 14 and for issuing reply messages and commands.

The four primary types of radio transmissions carried by the communications system include: (1) link messages from the lead unit 14 to each of the remote units 12A-12C that establish the communications system between the lead unit 14 and the remote units 12A-12C, (2) link reply messages that indicate reception and execution of the link message, (3) commands from the lead unit 14 that control one or more functions (e.g., application of motive power or braking) of one or more remote units 12A-12C and (4) status and alarm messages transmitted by the one or more remote units 12A-12C that update or provide the lead unit 14 with necessary operating information concerning the one or more remote units 12A-12C.

Each message and command sent from the lead unit 14 is broadcast to all of the remote units 12A-12C and includes the lead unit identifier. Messages and alarms sent from one of the remote units 12A-12C include the sending unit's address. As a result of the previously completed link-up process, the receiving unit, i.e., the lead or a remote locomotive, can determine whether it was an intended recipient of the received transmission, based upon the sending unit identification included within the message, and can respond accordingly. These four message types, including the address information included in each, ensure a secure transmission link that has a low probability of disruption from interfering signals within radio transmission distance of the train 18, provides control of the remote units 12A-12C from the lead unit 14 and provides remote unit operating information to the lead unit 14.

Although most commands are issued by the lead unit and transmitted to the remote units for execution as described above, there is one situation where a remote issues commands to the other remote units and the lead unit. If a remote unit detects a condition that warrants an emergency brake application, the remote transmits an emergency brake command to all other units of the train. The command includes identification of the lead locomotive of the train and will therefore be executed at each remote unit, as if the command had been issued by the lead unit.

The distributed power communications systems operates in one of two modes, synchronous control and independent control. In synchronous control, the remote units follow the throttle position of the lead unit. If the operator moves the throttle handle from a notch five position to a notch seven position, the communications system commands each of the enabled remote units to operate at a notch seven throttle. If the operator moves the throttle handle to a dynamic brake position (i.e., where the traction motors are operated to provide a braking force to the train), the communications system commands each remote unit to the same dynamic brake application.

The distributed power communications system also permits operation in an independent throttle control mode, where the operator segregates the train into a front group and a back group, and assigns remote units to each of the two groups. The assignments are dynamically controllable by the operator so that locomotives can be reassigned from the front group to the back group, and vice versa, while the train is operating.

The throttles of the remote units assigned to the front group follow the throttle positions of the lead locomotive. The throttles of the back group remote units are controlled independently of the throttles of the front group. This operational mode can be sued, for example, when the train is descending a mountain. As the train climbs the mountain, all remote units and the lead unit are providing maximum motive power (in a notch 8 throttle position). When the lead unit tops the crest, the lead locomotive throttle is moved to a dynamic brake position, while it is desired for the remote units to continue applying motive power to push the train over the mountain. As a mid-train remote tops the crest, it is reassigned to the front group so that dynamic brakes are applied at that remote unit. The process of reassigning the remote units from the back group to the front group continues until the last remote unit has been reassigned. In independent mode, the command message transmitted by the lead unit comprises a field for each remote unit of the train. Upon receipt at the remote unit, the pertinent field is checked and the remote unit is controlled according to the front or the back group.

BRIEF SUMMARY OF THE INVENTION

A first embodiment of the present comprises a railroad train having at least two spaced-apart locomotives capable of lead and remote operation, wherein a first locomotive operates as a lead unit for controlling operation of a second locomotive operating as a remote unit, and wherein the first and the second locomotives exchange information and commands over a communications channel controlled by a communications system, and wherein the train further comprises a plurality of rail cars, and wherein the first locomotive, the second locomotive and the rail cars each further comprise a brake system for braking the train under control of a manually operated brake handle having a lead position and a remote position, disposed in the first and the second locomotives. A method according to the first embodiment interchanges the status of the first and the second locomotives such that the first locomotive operates as the remote unit and the second locomotive operates as the lead unit. The method comprises determining whether current train operating conditions are acceptable for interchanging the status of the first and the second locomotives, applying brakes on the first and the second locomotives and the rail cars, suspending lead status of the first locomotive, configuring the first locomotive for remote unit operation, from the second locomotive, commanding the first locomotive to remote status and the second locomotive to lead status and conducting a brake system test.

Another embodiment comprises a communications system for a railroad train having first and second spaced-apart locomotives each capable of lead and remote operation and at least one mid-train locomotive disposed therebetween, wherein the first locomotive operates as a lead unit for controlling operation of the second locomotive and the at least one mid-train locomotive, both operating as remote units. The communications system comprises a communications channel, a station in the first locomotive responsive to train operator input for executing a locomotive swap function, further comprising transmitting signals over the communications channel to the second locomotive and the mid-train locomotive and receiving signals from the mid-train locomotive and a station in the second locomotive for executing the locomotive swap function by transmitting signals to the first locomotive and the mid-train locomotive over the communications channel, wherein after execution of the swap function the first locomotive operates as a remote unit, the mid-train locomotive operates as a remote unit and the second locomotive operates as a lead unit.

BRIEF DESCRIPTION OF THE DRAWINGS

The present invention can be more easily understood and the further advantages and uses thereof more readily apparent, when considered in view of the following detailed description when read in conjunction with the following figures, wherein:

FIGS. 1 and 2 illustrate a railroad train to which the teachings of the present invention can be applied.

In accordance with common practice, the various described features are not drawn to scale, but are drawn to emphasize specific features relevant to the invention. Reference characters denote like elements throughout the figures and text.

DETAILED DESCRIPTION OF THE INVENTION

Figure 3:
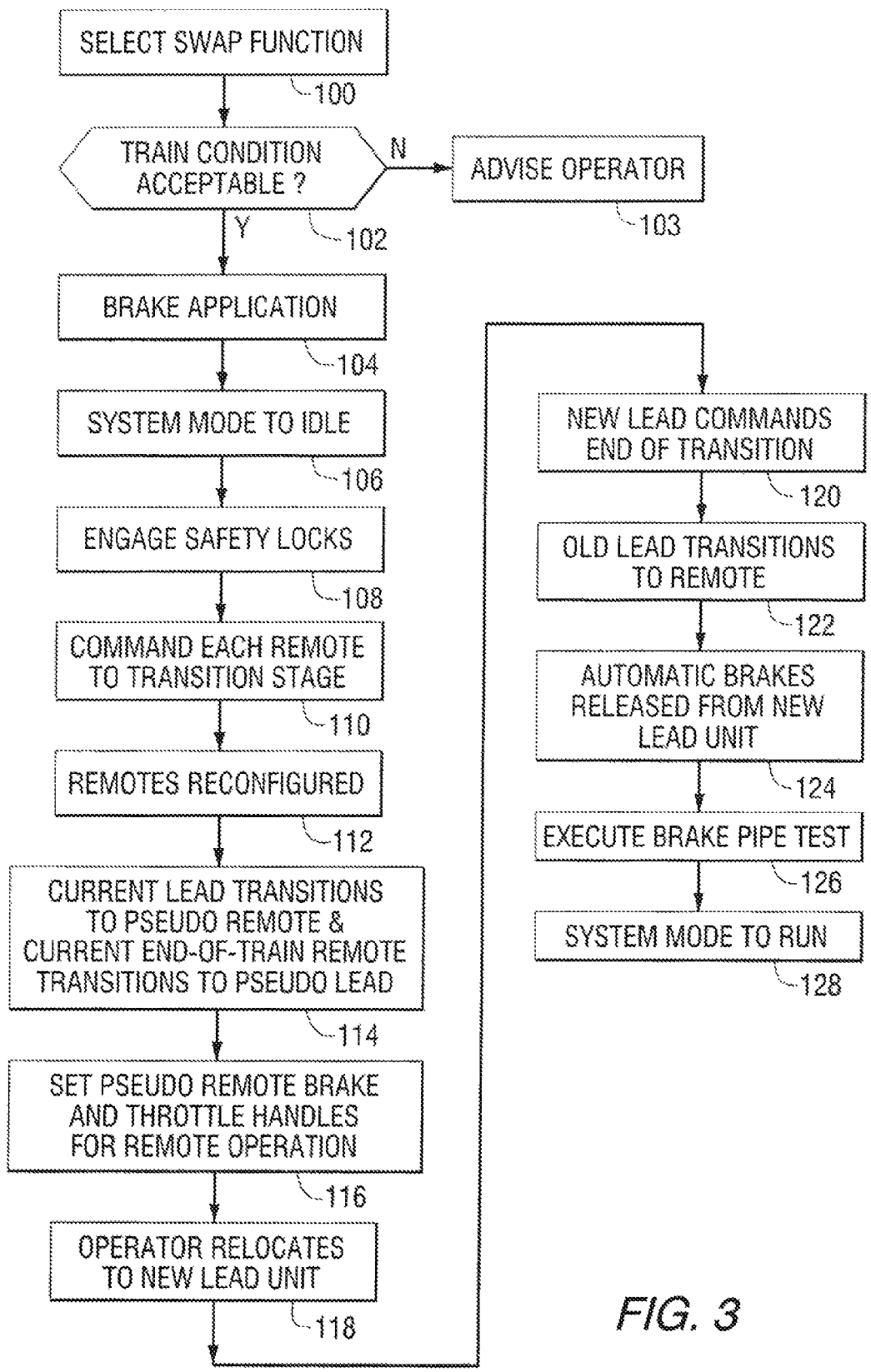
FIG. 3 is a flow chart illustrating the locomotive swapping technique according to the teachings of the present invention.

Before describing in detail the particular method and apparatus for swapping the lead and remote locomotives in a distributed power train in accordance with the present invention, it should be observed that the present invention resides primarily in a novel combination of hardware and software elements related to the locomotive swapping method and apparatus. Accordingly, so as not to obscure the disclosure with structural details that will be readily apparent to those skilled in the art having the benefit of the description herein, in the description that follows certain hardware and software elements have been described with lesser detail, while the drawings and the specification describe in greater detail other elements and steps pertinent to understanding the invention. The following embodiments are not intended to define limits as to the structure or use of the invention, but only to provide exemplary constructions. The embodiments are permissive rather than mandatory and illustrative rather than exhaustive.

According to the teachings of the present invention, the distributed power train communications system is augmented with a user-initiated function that reverses the status of the lead and end-of-train remote units to permit train operation from the former end-of-train remote locomotive, which is reconfigured to operate as the lead locomotive. This new function eliminates several steps required by the prior art to swap the lead and remote locomotives and executes the swapping function in less time. The swapping function of the present invention does not require recovery from a depleted brake pipe (an emergency or penalty brake application wherein the brake pipe pressure is substantially zero), which is one factor contributing to its shortened duration. Instead, brake pipe pressure is recovered from a nominal brake pipe pressure reduction associated with a service brake application. As is known in the art, re-pressurizing the brake pipe from a service brake application is faster than re-pressurizing from an emergency or penalty brake application.

FIG. 3 is a flow chart illustrating a first embodiment of a method for implementing the locomotive swapping function according to the teachings of the present invention. In one embodiment, the FIG. 3 method is implemented in a microprocessor and associated memory elements within the locomotives of the railroad train, for example, within the lead station 30 and the remote station 32. In such an embodiment the FIG. 3 steps represent a program stored in the memory element and operable in the microprocessor. When implemented in a microprocessor, program code configures the microprocessor to create logical and arithmetic operations to process the flow chart steps. The invention may also be embodied in the form of computer program code written in any of the known computer languages containing instructions embodied in tangible media such as floppy diskettes, CD-ROM's, hard drives, DVD's, removable media or any other computer-readable storage medium. When the program code is loaded into and executed by a general purpose or a special purpose computer, the computer becomes an apparatus for practicing the invention. The invention can also be embodied in the form of a computer program code, for example, whether stored in a storage medium loaded into and/or executed by a computer or transmitted over a transmission medium, such as over electrical wiring or cabling, through fiber optics, or via electro-magnetic radiation, wherein when the computer program code is loaded into and executed by a computer, the computer becomes an apparatus for practicing the invention.

The FIG. 3 flow chart begins at a step 100 where the locomotive operator in the current lead unit selects a swap function for execution by the communications system. At a step 102, the program determines whether train conditions are acceptable for implementing the swap function. A negative response from the decision step 102 advises the operator that conditions are unacceptable at a step 103. Generally, the conditions required for implementation of the swap function include: lead locomotive throttle in an idle position, lead locomotive independent (i.e., locomotive) brakes set, lead locomotive at zero speed and lead locomotive reverser handle (for selecting forward or reverse direction operation) in a center off position.

If train conditions are acceptable, processing continues to a step 104 where a full service brake application is automatically commanded by the swap function or executed manually by the train operator (in another embodiment, a full service brake application is not effected, but instead the brake pipe pressure is reduced to a pressure greater than a full service brake application). The command is transmitted to all remote units via the communications system for execution. All locomotives of the train hold this brake application during the swap period (i.e., unless train conditions warrant otherwise).

At a step 106 the communications system is commanded to an idle mode and awaits operator actions, as described below, to complete the swap function.

At a step 108 safety interlocks for a parked train are engaged. Generally, the interlocks prohibit application of traction effort and prohibit a brake release, thereby preventing train movement until the transition period is over and the communications system is again operative. In other embodiments, additional or different interlocks may be specified according to current train conditions and common practices of the railroad operator/owner, especially recognizing that during certain periods of the swap function there may not be an operator aboard the train, as he/she will be in transit from the former lead unit to the new lead unit. In one embodiment, the safety interlocks include disabling or cutting-out the remote units. In this condition, the remote units can respond to the brake pipe pressure changes, but cannot control the brake pipe pressure (except to command an emergency brake application).

At a step 110, the current lead unit commands each remote unit to a transition state, i.e., the communications system is transitioning to a configuration with a new lead unit for the train. According to the LOCOTROL® communications system, the step 110 is implemented using modified link and link reply messages as described above. The modified link message, transmitted from the current lead locomotive, advises all remote units, in succession, that a new lead unit will be designated and provides the remote units with an address or other identification information of the new lead unit. In response to the modified link message, each remote unit, in succession, transmits a link reply messages back to the current lead unit indicating that the link message has been received and properly processed, and further including the address of the transmitting remote unit.

A step 112 depicts remote unit reconfiguration, as appropriate, in response to the modified link message. Mid-train remote units reconfigure to accept commands and messages from a new lead unit, i.e., a new lead unit address, and may have to reverse their train line orientation. According to certain embodiments, mid-train remote units may be aware of their mid-train position, either as a result of the initial link-up process or the swap process.

During this transition stage, any remote unit (and the current lead unit) can generate an emergency brake application via the brake pipe (and on one embodiment also via the radio communications link according to the method described above in conjunction with normal operation of the distributed power communications system), in response to the occurrence of an emergency condition on the train. In response to the emergency brake application, the remaining remote units and the current lead unit evacuate the brake pipe to effect the emergency brake application at all the railcars and at the locomotives. Generally, train faults that can lead to loss of train control, when sensed at a remote unit (or the lead unit), will generate an emergency brake application.

According to one embodiment of the present invention, the remote units and the current lead unit may also be able to initiate a penalty brake application.

As indicated at a step 114, the former lead unit transitions to a pseudo-remote state and prompts the operator to place the automatic and independent brake handles in a remote operation position for operation as a remote unit. See a step 116. Typically, for remote operation the automatic brake handle is in a handle off position and the independent brakes are in a release position. Whenever the automatic and independent brake handles are in the remote operation position, the automatic and the independent brakes are applied in response to a command issued by the lead unit and received by the remote unit over the communications link. Like the mid-train remote units, the pseudo-remote can command an emergency brake application via the brake pipe and via the communications system while the transition phase is in progress.

For remote operation, the throttle handle is placed in the idle position and the reverser handle is placed in a center position (no direction selected) or removed. The throttle and the reverser are thus controlled in response to a command issued by the lead unit and received by the remote unit over the communications link.

Also at the step 114, the current end-of-train remote transitions to pseudo-lead operation. During this state, the pseudo-lead unit can command an emergency brake application (and a penalty brake application according to one embodiment). Also, according to one embodiment, the pseudo-lead unit generates periodic train and communications system status checks and monitors the safety interlocks. The air brake on this unit responds to commands as though it is a remote unit during this transitional state.

None of the locomotives in the train can command a brake release during the swap phase. The train operator can command tractive effort directly at the pseudo-lead unit and the current lead unit, but the communications system does not propagate the traction command to the remote units.

A step 118 indicates that the train operator relocates from the former lead unit to the new lead unit. After boarding the new lead unit, the operator confirms that the communications system is still in the transition state. From the new lead unit, the operator sends a command to the former lead unit and the remote units for terminating the transition state, placing the communications system in a normal operational mode. See a step 120. Upon receipt of the end-transition command, the former lead unit transitions to standard remote unit functionality, as indicated at a step 122. Note that it is not necessary for the train operator to reconfigure the mid-train remote units prior to beginning train operation, as is required by the prior art.

At the new lead unit, the operator releases the automatic brakes and waits for the brake pipe to charge from the service brake application pressure to the fully pressurized state.

At a step 126, the operator executes a conventional brake pipe continuity test or train check test from the new lead unit. Upon successful completion of the test, the operator places the communications system in a run mode as indicated at a step 128. Both the communications system and the braking system are now ready for train movement.

One example of a brake pipe continuity test proceeds as follows. The test is executed according to the present invention to determine if the train air brakes are in condition for safe operation. Specifically, the brake pipe test determines that the brake pipe is continuous from the head end to the end of train and that the brake pipe flow measuring sensor at each of the remote locomotives is operating properly. In particular, the flow measuring sensor at the former lead unit, which is now operating as a remote, is checked to determine proper operation.

The test begins after the brake pipe has been recharged (or when the rate at which air is being supplied to the brake pipe has dropped below a predetermined value, indicating that the brake pipe is nearly recharged). The lead unit 14 sends a message to the remote units 12A-12C via the communications system advising that a brake pipe test is to be initiated. A service brake application is then commanded manually by operator-initiated operation of the automatic air brakes at the lead unit or the service brake application is initiated automatically without operator intervention. In any case, the service brake application is initiated via the brake pipe; the lead unit 14 does not transmit a brake application command over the communications channel to the remote units 12A-12C. Coincident with initiating the service brake application, the lead unit 14 sends a message advising the remote units 12A-12C to expect a flow rate change in the brake pipe as the brake pipe pressure is reduced to execute the service brake application. A timer begins running concurrent with the brake application at the lead unit 14, and at the remote units relative to the brake test advising message transmitted by the lead unit 14.

When the pressure reduction in the brake pipe reaches the first remote unit 12A, the remote unit 12A attempts to fill the brake pipe to compensate for the pressure reduction. A flow sensor at the remote unit 12A measures the flow rate at which the remote unit 12A is charging the brake pipe. If a sufficient flow rate is detected in accordance with predetermined flow rate criteria, an appropriate message is formatted and transmitted from the remote unit 12A to the lead unit 14. The remote unit 12A also initiates a service brake application that propagates toward the rear of the train 18. Each remote unit in succession senses the brake pipe pressure reduction, recharges the brake pipe, sends a reply message to the lead unit 14 and initiates a service brake application. The timer at each remote unit allows the remote unit to advise the lead unit of the time between receipt of the lead's command and the remote's sensing of the flow rate. This process allows the lead unit to determine an order of the remote units in the train, since the remote units transmit their identification in the reply message.

The brake pipe continuity test is passed if the lead unit 14 receives the reply message from each of the remote units 12A-12C before the timer times out. The brake pipe continuity test fails if a message is not received from each of the remote units 12A-12C prior to the timer timing out (90 seconds in one embodiment).

As an alternative to applying a service brake application to conduct the brake pipe continuity test, another pressure signal, such as for example an air brake pipe pressure perturbation signal, can be applied to the brake pipe. The remote units attempt to fill the brake pipe upon sensing the perturbation signal and generate the reply message in response thereto.

In yet another embodiment, a train check test is conducted in lieu of the brake pipe continuity test, to verifies brake pipe continuity, whereas the brake pipe test verifies that each of the remote locomotives can sense a brake pipe pressure reduction. According to the train check test, the operator releases the brakes to recharge the brake pipe. The lead unit 14 transmits a message to the remote units 12A-12C advising that a train check test has been initiated. When the remote unit 12A senses the pressure increase, it releases its brakes by charging the brake pipe and sends a message to the lead unit 14 advising that the pressure increase was observed. The pressure increase initiated at the remote unit 12A propagates toward the rear of the train 18. The remaining remote units 12B and 12C similarly detect the pressure increase and advise the lead unit 14. Advantageously, the train check test verifies brake pipe continuity without incurring the time penalty of a brake application as required by the brake pipe continuity test. Disadvantageously, the train check test does not monitor the flow rate at the remote units (and therefore does not verify proper operation of the flow sensor (detector) at each remote unit), as does the brake pipe test, but instead only monitors a pressure increase.

While the invention has been described with reference to preferred embodiments, it will be understood by those skilled in the art that various changes may be made and equivalent elements may be substituted for elements thereof without departing from the scope of the present invention. The scope of the present invention further includes any combination of the elements from the various embodiments set forth herein. In addition, modifications may be made to adapt a particular situation to the teachings of the present invention without departing from its essential scope. Therefore, it is intended that the invention not be limited to the particular embodiment disclosed as the best mode contemplated for carrying out this invention, but that the invention will include all embodiments falling within the scope of the appended claims.

What is claimed is:

1. A communications system for a railroad train having first and second spaced-apart locomotives, wherein the first locomotive operates as a lead unit for controlling operation of the second locomotive operating as a remote unit, the communications system comprising:
   a communications channel;
   a station in the first locomotive for issuing a first command over the communications channel to the second locomotive in response to which the first locomotive applies a brake system and enters a suspended operational state during which lead operation of the first locomotive is suspended; and
   a station in the second locomotive for issuing a second command over the communications channel to the first locomotive for controlling the first locomotive to remote operation and the second locomotive to lead operation, and for terminating the suspended operational state.

2. The communications system of claim 1 wherein the first command comprises a command to make a service brake application.

3. The communications system of claim 1 wherein the first command comprises a command to prohibit application of tractive effort at the second locomotive.

4. The communications system of claim 1 wherein the first command comprises a link message identifying the second locomotive.

5. The communications system of claim 4 wherein a station in the first locomotive responds to the link message with a link reply message indicating successful reception and execution of the link message.

6. The communications system of claim 1 wherein the second command returns the communications system to normal operation.

7. The communications system of claim 1 further comprises a third command issued by the second locomotive comprising a command to perform a brake system test.

8. The communications system of claim 7 wherein the brake system test further comprises one of a brake pipe continuity test and a train check test.

9. A communications system for a railroad train having first and second spaced-apart locomotives, wherein the first locomotive operates as a lead unit for controlling operation of the second locomotive operating as a remote unit, the communications system comprising:
   a communications channel;
   a first station in the first locomotive responsive to train operator input for executing a locomotive swap function, further comprising transmitting signals including a brake application command over the communications channel to the second locomotive in response to which the second locomotive applies a brake system and enters a suspended operational state during which lead operation of the first locomotive is suspended; and
   a second station in the second locomotive for executing the locomotive swap function by transmitting signals to the first locomotive over the communications channel, wherein after execution of the swap function the first locomotive operates as a remote unit and the second locomotive operates as a lead unit.

10. The communications system of claim 9 wherein signals transmitted by the first station comprise a signal prohibiting application of traction effort at the second locomotive.

11. The communications system of claim 9 wherein the railroad train further comprises a mid-train locomotive disposed between the first and the second locomotives and operative as a remote unit, wherein the signals transmitted by the first station are transmitted to the second locomotive and the mid-train locomotive, and wherein the signals transmitted by the second station are transmitted to the first locomotive and the mid-train locomotive.

12. The communications system of claim 9 wherein the signals transmitted by the first station comprise a link message identifying the second locomotive.

13. The communications system of claim 12 wherein a station in the mid-train locomotive transmits a link reply message to the first locomotive.

14. The communications system of claim 9 wherein signals transmitted by the second station comprise a message for initiating normal operation of the communications system with the first locomotive operating as a remote unit and the second locomotive operating as the lead unit.

* * * * *